UNITED STATES PATENT OFFICE.

ALBERT HEMPEL, OF LEIPZIG-OETZSCH, GERMANY.

PROCESS OF MAKING OXALATES.

1,070,806.  Specification of Letters Patent.  Patented Aug. 19, 1913.

No Drawing.  Application filed February 24, 1912. Serial No. 679,683.

*To all whom it may concern:*

Be it known that I, ALBERT HEMPEL, doctor of philosophy and a chemical engineer, a citizen of the Kingdom of Saxony, in the German Empire, residing at Leipzig-Oetzsch, in the Kingdom of Saxony, German Empire, have invented certain new and useful Improvements in Processes of Making Oxalates; and I do hereby declare the following to be a full, clear, and exact description of the invention, such as will enable others skilled in the art to which it appertains to make and use the same.

This invention relates to an improved process of making oxalates.

According to the oxalate process hitherto employed a formate is mixed with neutral substances and this mixture is then heated. The conversion of formates into oxalates can also be obtained according to the process described in my British Patent No. 3429, of February 15, 1908, by which the formate is heated at a pressure higher than that of the atmosphere from 200° up to a maximum of 440° C. without any indifferent substances being added.

According to my United States Patent No. 1,017,261 formate is produced by adding caustic soda in successive quantities to carbon monoxid under an increased pressure and at a temperature below and above 200° C., with the carbon monoxid in excess; the formate reaction will be the quicker and more favorable, the larger the quantity of gas escaping therefrom. This, however, would mean losses in carbon monoxid gas, which is contained up to 30 per cent. in producer-gas, as the gas escaping from the formate autoclaves is poor in carbon monoxid and rich in nitrogen and cannot be used for the further production of formate. The present invention allows of fully utilizing this surplus gas obtained by the production of formate according to my United States Patent No. 1,017,261 and applying this gas for converting formate into oxalate. As stated before, this gas still contains large quantities of carbon monoxid. It escapes from the formate autoclave at a pressure of from 6–10 atmospheres and at a temperature of from 150°–200° C. When this gas is conducted over finished formate heated to 300°–440° C., the formate will be much more rapidly converted into oxalate and above all in an absolutely safe and cheaper manner. The high temperature and high pressure of this gas is favorable to the formation of oxalate and can be utilized to advantage. Also the contents of carbon monoxid in this gas can be utilized, as any free alkali still contained in the formate will be subsequently converted by the carbon monoxid first into formate and then into oxalate. Therefore there will be no loss of expensive caustic alkali and the resulting oxalate is therefore, being free from caustic alkali, of a much higher value. As the carbon monoxid contained in this gas will subsequently have converted all free caustic alkali contained in the formate, into formate, the conversion of formate into oxalate will be almost quantitatively complete and without any decomposition.

According to the present process the hydrogen liberated during the formation of oxalate proceeding under pressure will be immediately removed *in statu nascendi* by the formate waste-gas passing under pressure through the oxalate apparatus. The generation of hydrogen will be gradual, and a sudden generation of hydrogen and explosions caused thereby are rendered impossible according to the present process.

The novel technical effects of the present process have never been attained by any known oxalate process.

This advantageous process permits that the formation of formate and oxalate is carried out in one and the same apparatus. When according to the United States patent referred to caustic soda has been converted into formate (the completion of the reaction being observed by a drop of the temperature) the formate produced is gradually heated to more than 360°–440° C. under continuation of the supply of carbon monoxid, or while another waste-gas, escaping from a not yet completed formate autoclave, is passed through the same.

I claim:

The process herein described of making oxalates, which consists in heating formates gradually to a temperature of from 360°–440° C. while passing through it the hot waste-gas which is obtained in the manufacture of formate from carbon monoxid and caustic alkali.

In testimony, that I claim the foregoing as my invention, I have signed my name in presence of two subscribing witnesses.

ALBERT HEMPEL.

Witnesses:
 RUDOLPH FRICKE,
 FRITZ GUINING.